Oct. 4, 1932. C. C. JACOBSON ET AL 1,881,278
SOLDER WIRE EXTRUSION PRESS
Filed June 7, 1930   6 Sheets-Sheet 5

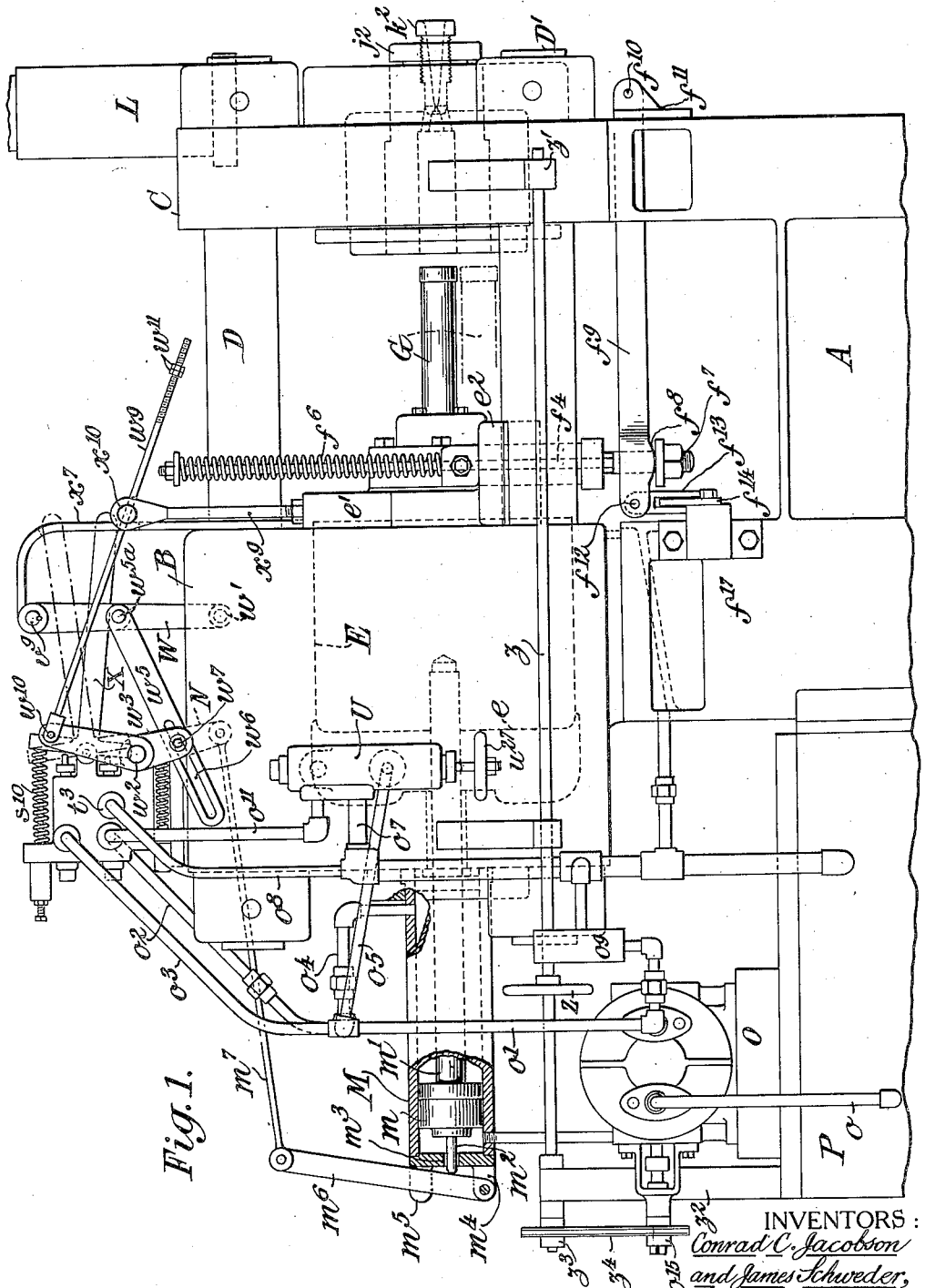

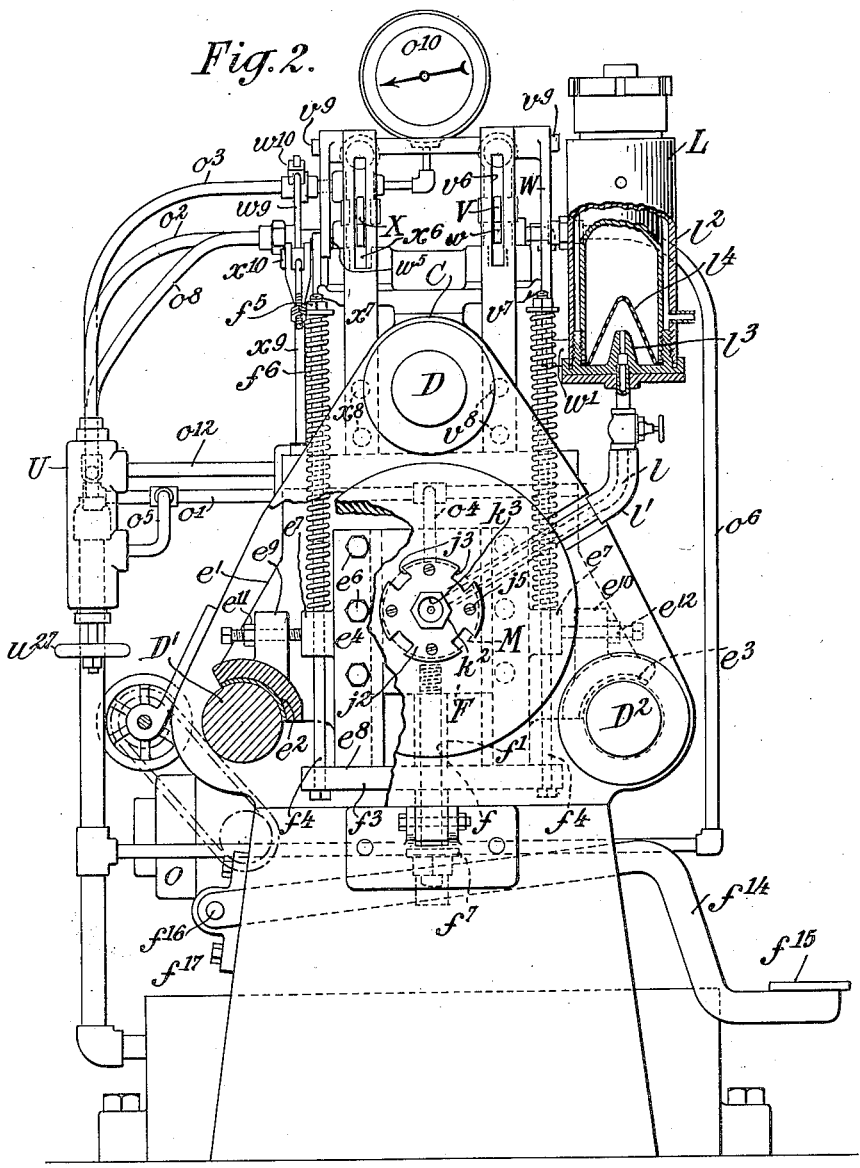

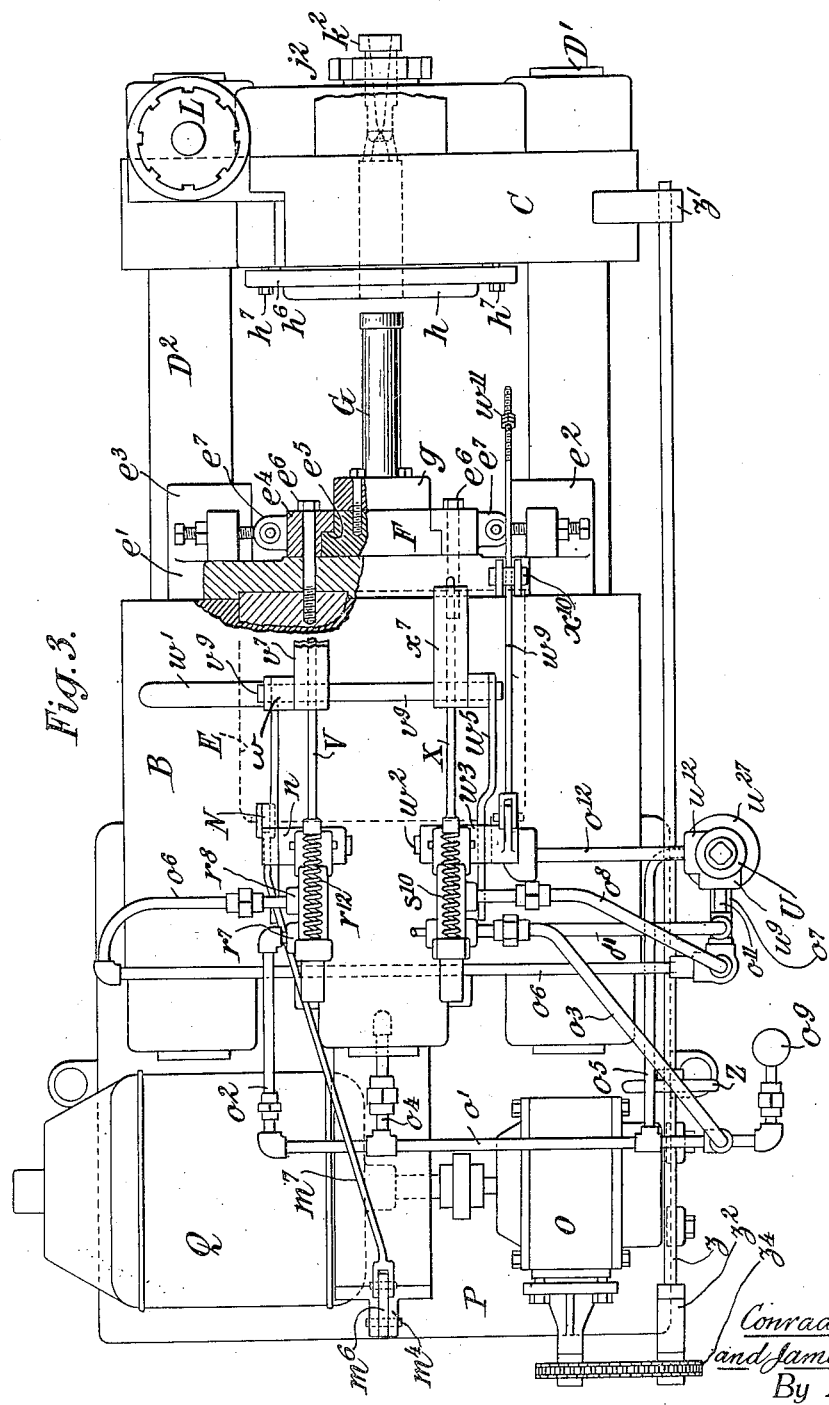

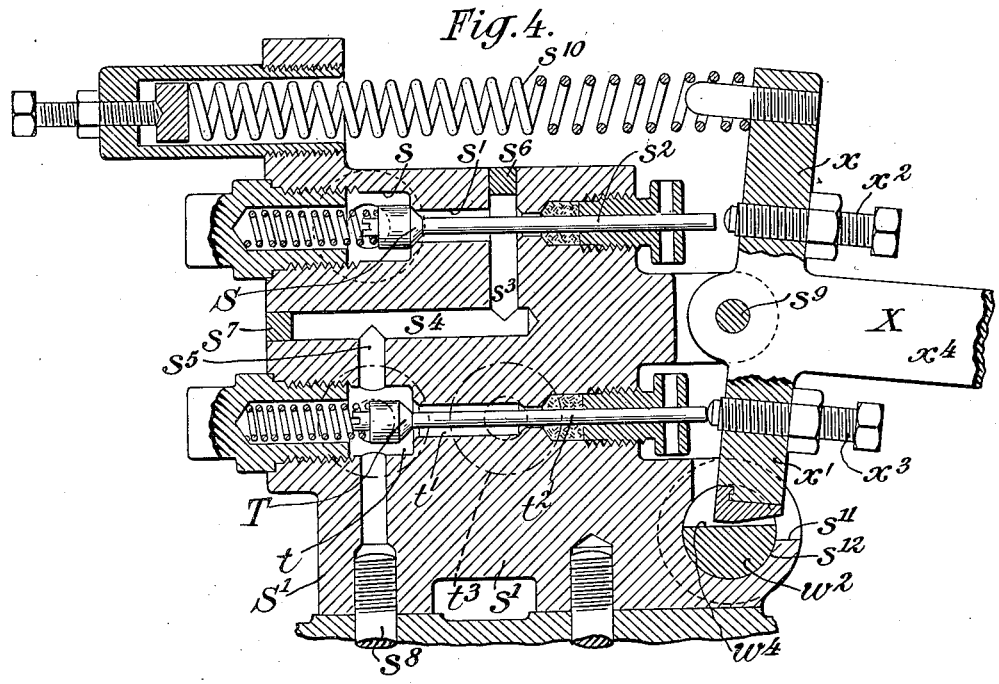
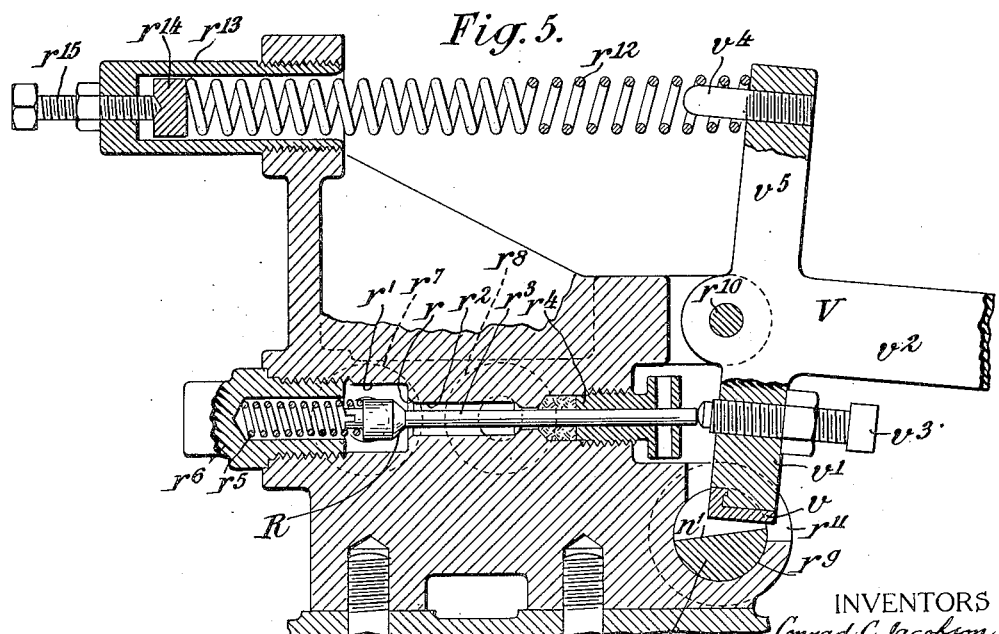

INVENTORS:
Conrad C. Jacobson
and James Schweder,
By Attorneys,
Fraser, Myers & Manley.

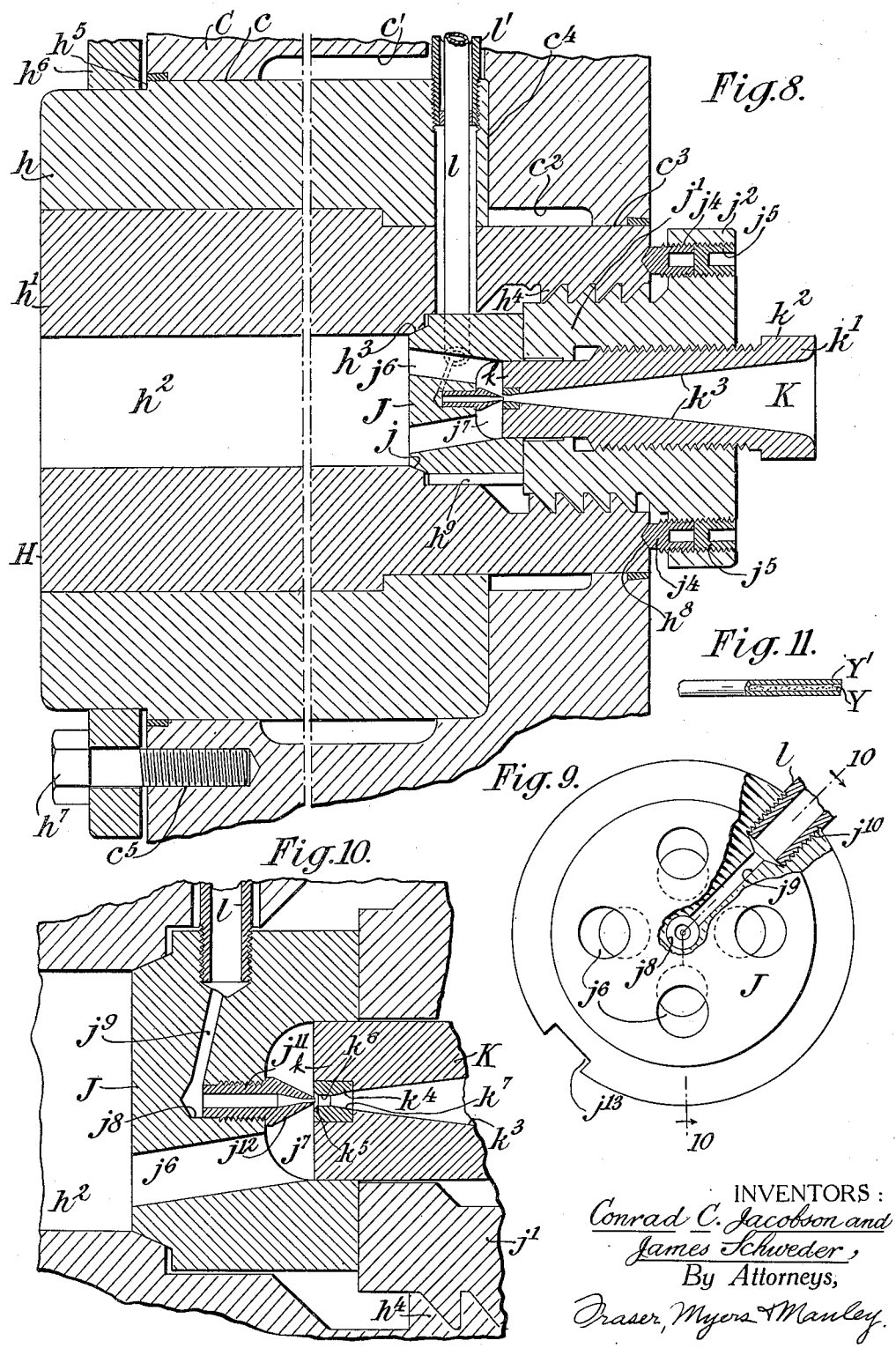

Patented Oct. 4, 1932

1,881,278

UNITED STATES PATENT OFFICE

CONRAD C. JACOBSON, OF GLEN RIDGE, NEW JERSEY, AND JAMES SCHWEDER, OF BROOKLYN, NEW YORK, ASSIGNORS TO JOHN ROBERTSON CO. INC., OF BROOKLYN, NEW YORK, A CORPORATION OF NEW YORK

SOLDER WIRE EXTRUSION PRESS

Application filed June 7, 1930. Serial No. 459,755.

The present invention relates to extrusion presses and aims to provide certain improvements therein. More particularly it relates to a hydraulically operated extrusion press for producing cored solder wire.

Among the objects of the present invention are: To provide a press of the type described in which the movement of the ram is automatically reversed at the end of the extrusion stroke; one in which valves automatically open a hydraulic circuit to by-pass the liquid from the pump when the ram is in its rearmost position; one in which the return stroke of the ram is performed more quickly than the extrusion stroke; one in which the speed of extrusion is manually controllable; one wherein the ram is adapted to be manually moved to facilitate the charging of the extrusion cylinder with a slug; one in which there is a balanced metal flow chamber around the core nozzle to prevent bending of said nozzle; and one in which the die is adjustable in relation to the core whereby the size of the extruded product can be controlled and wherein the flux is maintained heated from the flux chamber to the forming chamber.

The foregoing and additional objects, which will be readily appreciated from the detailed description which follows, are accomplished by the present invention, a preferred embodiment of which is illustrated in the accompanying drawings, wherein Figure 1 is a side elevation, partly in section, of the extrusion press of the present invention.

Fig. 2 is an end elevation, partly in section, of the press shown in Fig. 1, when viewed from the left of said figure.

Fig. 3 is a top plan view, partly in section, of the press as shown in Fig. 1.

Figs. 4 and 5 are sections, partly in elevation, of the main cylinder valve and the backing cylinder valve, respectively.

Fig. 8 is a sectional detail of the delivery end of the press.

Fig. 9 is an elevation, partly in section, of the flow chamber head of the extrusion cylinder.

Fig. 10 is a section taken substantially along the planes of the line 10—10 of Fig. 9.

Fig. 11 is an elevation, partly in section, of a piece of cored solder wire, the product formed by said machine.

Figure 6:
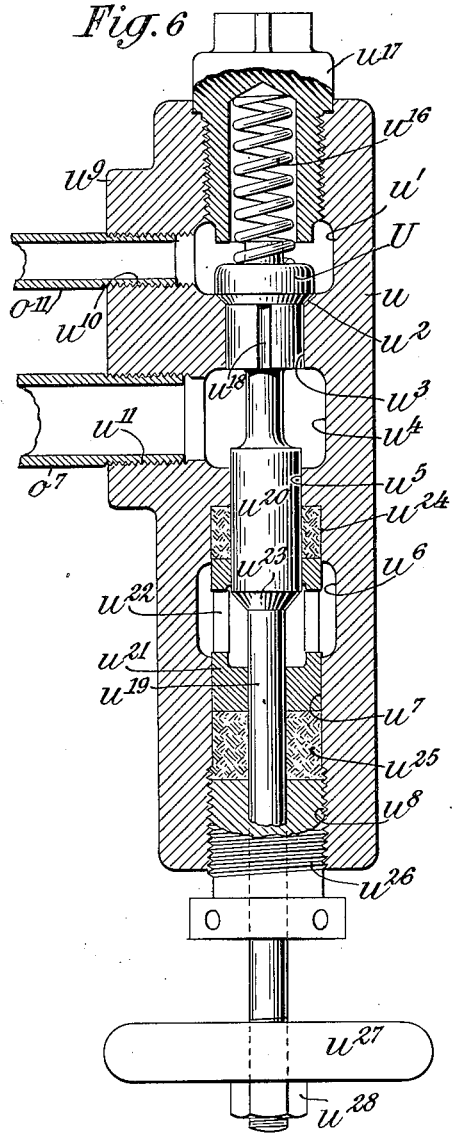
Figs. 6 and 7 are longitudinal sections, partly in elevation, of the quick return valve, Fig. 7 being taken substantially at right angles to Fig. 6.
Figure 7:
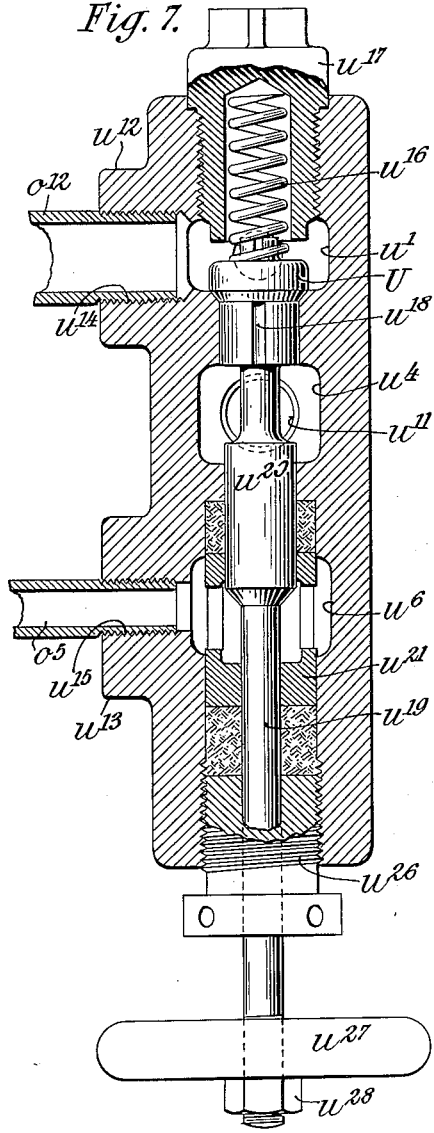

Referring to the drawings, the machine or press frame consists of a base A upon which are mounted in spaced relation triangular end members B and C which are connected together by spacing and tension arms D, D' and $D^2$ disposed substantially at the angles of the end members.

The end member B is centrally bored from its left-hand end to provide a main cylinder E, within which is mounted a movable piston $e$, the outer end of which carries a head-plate $e'$ provided with arcuate bushed bearing portions $e^2$ and $e^3$ which slidably engage upon the tension arms D' and $D^2$ respectively. The head-plate $e'$ is fitted with a secondary head member $e^4$ which has a T-shaped groove $e^5$ extending vertically therethrough. The head-plates $e'$ and $e^4$ are secured together and to the piston $e$ through the medium of a plurality of headed bolts $e^6$.

Mounted for slidable movement within the T-shaped groove $e^5$ is a T-shaped head-block F, to the outer face of which is secured the enlarged head $g$ of the extrusion ram G. Supported by the block F from its underside through the medium of a bolt $f$ and a spacing sleeve $f'$ is a cross-head $f^3$, which, at each of its ends, is provided with a vertically extending bolt $f^4$ which passes through ears $e^7$ extending laterally from the sides of the head-plate $e^4$. The bolts $f^4$ are provided at their tops with flanged nuts $f^5$, between which and the ears $e^7$ are disposed coil springs $f^6$ which encircle the bolts. The springs $f^6$ normally function to hold the slide block F in its uppermost position, in which the ram G is in axial alignment with the piston $e$ and the extrusion chamber. The bottom edge $e^8$ of the head-plate $e^4$ serves as a limiting stop for the upward movement of said slide block. To move the slide block F downwardly and with it the ram G so as to facilitate the insertion of a slug into the extrusion chamber, there is mounted at the lower end of the bolt F a flanged nut $f^7$, upon the flange of which rest the rocker faces $f^8$ of a bifurcated lever $f^9$, one end of which is pivoted at $f^{10}$ to a bracket $f^{11}$ secured to the base A, and the other end of said lever being provided with a pin $f^{12}$ which extends through the bight of a U-shaped link $f^{13}$. Extending through the link $f^{13}$ and pivotally connected thereto is a treadle lever $f^{14}$, one end of which is provided with a foot treadle $f^{15}$, and the other end of which is pivotally mounted, as shown at $f^{16}$, to a bracket $f^{17}$ secured to the base A. For laterally centering the arm G and its carrier block F, and for equalizing the thrust upon the tension members D' and $D^2$, the bearings $e^2$ and $e^3$ are provided with upstanding lugs $e^9$ and $e^{10}$, respectively, through which pass adjustable bolts $e^{11}$ and $e^{12}$, respectively, the ends of which engage the outer faces of the lugs $e^7$.

The end member C is centrally bored and machined, as shown at $c, c', c^2, c^3$ (Fig. 8) to accommodate the slug-receiving chamber or extrusion cylinder H. This member H consists of two concentric casings $h$ and $h'$, the latter being longer than the former and extending completely through the end member C. The casing $h'$ has a central bore or chamber $h^2$ extending for a major portion of its length and in which the slug to be extruded is receivable. At its inner end the bore $h^2$ is formed with a tapered seat $h^3$, beyond which the bore is enlarged and internally screw-threaded, as shown at $h^4$. The casings $h$ and $h'$ are fitted together to be movable as a unit and are adapted to be removably held within the end housing C. This is accomplished by having the inner end of the housing $h$ abut against a shoulder $c^4$ of the member C and by having the housing $h$ near its outer end provided with a shoulder $h^5$ which is adapted to provide an abutment for a clamping ring $h^6$ through which securing bolts $h^7$ pass and are adapted to engage in threaded openings $c^5$ in the member C.

Positioned within the enlarged bore of the casing $h'$ and seating against the tapered shoulder $h^3$ therein is a plug J having a tapered shoulder $j$ which is complemental to the shoulder $h^3$ and adapted to seat thereagainst. The plug J is held in leak-tight contact with the casing $h'$ through the medium of a sleeve $j'$ having an enlarged head $j^2$, said plug being externally screw-threaded to engage the internal threads $h^4$ of the casing $h'$. To facilitate applying a great pressure upon said plug J, the head $j^2$ is formed with diametrically opposed spanner sockets $j^3$. To lock the members $j'$ and $h'$ together set screws $j^4$ pass through threaded openings in the head $j^2$ and seat in depressions $h^8$ in the outer end of the casing $h'$. To further lock said parts, locking plugs $j^5$ engage in the threaded openings in the head $j^2$ through which the set screws $j^4$ extend and seat against the outer ends of said set screws, as best shown in Fig. 8. Plug J is formed with a plurality of perforations or openings $j^6$ disposed in a circle concentric with the plug and extending through said plug in inclined relation to the axis thereof, and terminate in an enlarged central chamber $j^7$ in said plug. Extending rearwardly of said chamber $j^7$ centrally of said plug is a bore $j^8$ which communicates with a radial bore $j^9$, the outer end of which is enlarged and internally threaded, as shown at $j^{10}$. The bore $j^8$ is internally screw-threaded, and fitted therein is a nozzle $j^{11}$ having a conical end $j^{12}$ extending into the chamber $j^7$. To hold the plug J in a definite relation with respect to the casing $h'$ so that the threaded bore $j^{10}$ will have a fixed relation thereto, the casing $h'$ is fitted with a key or spline $h^9$ for engagement within a keyway or slot $j^{13}$ formed in the periphery of the plug J.

Extending through a central bore in the sleeve $j'$ and screw-threadedly carried thereby is a die K, the inner end $k$ of which extends into the flow chamber $j^7$ and provides a tight seal with the wall thereof, and the opposite end $k'$ of which is somewhat enlarged and provided with wrench engaging surfaces $k^2$. The die member K has a tapered bore $k^3$ extending centrally therethrough, the inner end of which is somewhat enlarged and fitted with a quill $k^4$, the inner end of the bore of which is tapered, as shown at $k^5$, said taper being complemental to the taper on the nozzle head $j^{12}$, the tip of which it encircles. Rearwardly of the tapered bore $k^5$ the quill has a bore $k^6$, the diameter of which governs the diameter of the solder wire extruded from the press, and rearwardly of $k^6$ the bore is tapered outwardly, as shown at $k^7$, which taper is substantially flush with the tapered bore $k^3$. By adjusting the die member K axially with respect to the nozzle $j^{11}$, the thickness of the solder shell surrounding the core is thereby governed.

For supplying solder paste or flux which is to constitute the core of the solder wire produced by the press to the nozzle $j^{11}$, there is provided a paste chamber L and leading therefrom a valved conduit $l$, the inner end of which screw-threadedly engages within the bore $j^{10}$. In order that the paste may be maintained in a fluid condition so as to freely flow from the chamber L to the extrusion die, the conduit $l$ is provided with a spaced steam jacket $l'$ between the flux chamber L and the forming chamber casing $h$. To maintain the paste or flux melted within the chamber L, the same is provided with an enclosing steam jacket $l^2$. To prevent foreign matter or solid particles from passing into the conduit $l$ the bottom of the chamber L is provided with an internally-directed or re-entrant conical head $l^3$ having a bore therethrough connecting with the conduit $l$, and disposed in spaced relation to said conical head $l^3$ is a conical strainer $l^4$. It will be understood that the steam jacketing around the chamber L and conduit $l$ are provided with suitable induct and educt tubes for the steam and with suitable packings for preventing escape of the steam. It will also be understood that if desired, other forms of heating means for the flux may be employed.

At the rear of cylinder E the end member B has secured thereto a backing cylinder M in axial alignment with the cylinder E. Positioned and movable within said cylinder M is a piston $m$ having a piston rod $m'$ which passes through the end of cylinder E and is connected to the piston $e$, from which it will be apparent that the pistons $e$ and $m$ both move as a unit. The piston $m$, at its side opposite to that which the piston rod $m$ is connected to, is provided with an axially-extending pin $m^2$, which, at the end of the rearward stroke of the piston $m$ extends through an opening $m^3$ in the rear end of the cylinder M. The rear end of the cylinder M is provided with a pair of diametrically disposed bifurcated lugs or ears $m^4$ and $m^5$, to the former of which is pivotally connected one end of a link $m^6$ which passes through and is guided by the bifurcated lug $m^5$, the other end of said link being pivotally connected to one end of a rod $m^7$, the other end of which is pivotally connected to one end of a lever N, the other end of which has a hub $n$, the function for which will presently appear.

The movements of the ram G are controlled by hydraulic pressures upon the pistons $e$ and $m$. These hydraulic pressures are created by a suitable type of variable delivery liquid pressure pump O mounted upon the top of an oil tank P and driven by an electric motor or other source of motive power Q. The pump O is supplied with oil from the tank P through the pipe $o$ and delivers said oil to the various parts of the hydraulic circuit through the pipes $o'$ $o^2$, $o^3$, $o^4$ and $o^5$, the oil being returned to the tank P through the pipes $o^6$, $o^7$ and $o^8$. As is conventional, the hydraulic circuit is provided with a safety valve $o^9$ and a pressure gauge $o^{10}$.

In the hydraulic circuit are located the following valves: backing cylinder valve R, a primary main cylinder valve S, a secondary main cylinder valve T and a quick return valve U. The valves R, S and T are preferably of the spring-seated spindle type and are provided with mechanical means for unseating them, the details of which will be presently described. The valve U is also of the spring-seated type but is adapted to be automatically unseated by hydraulic pressure in a manner to be presently described.

The backing cylinder valve R is mounted on the top of the end member B within a suitable casing which is provided with a valve seat $r$, a valve chamber $r'$ above said seat, a valve bore $r^2$ below said seat, a valve pin $r^3$ extending through said bore $r^2$ and through a packed guiding sleeve $r^4$, through the end of which the valve pin projects. The valve R is normally held against seat $r$ by a coil spring $r^5$ housed within a hollow cap nut $r^6$. The tube $o^2$ is connected to a boss $r^7$ which has a bore leading to the valve chamber $r^1$ and the tube $o^6$ is connected to a boss $r^8$ having a bore leading to the bore $r^2$ below the valve seat $r$.

It will thus be seen that when the valve R is seated, oil under pressure cannot pass through the chamber $r'$, and when the valve R is unseated, oil under pressure will pass through the chamber $r'$, through the bore $r^2$ and out through the pipe $o^6$ back to the tank. Extending through the housing of the valve R below the end of the valve rod $r^3$ is a bore $r^9$, through which extends the hub $n$ of the lever N, a part of said hub $n$ being cut away, as shown at $n'$, to provide an activating face for the end $v$ of the arm $v'$ of a T-shaped lever V, which lever is pivoted at the end of its upright bar $v^2$ to the housing of the valve R, as shown at $r^{10}$. To provide clearance and freedom of movement for the end $v$, the bearing $r^9$ is cut away, as indicated at $r^{11}$. Extending through the branch $v'$ is an adjustable set screw $v^3$ adapted to be adjusted to engage the end of the valve rod $r^2$ to unseat the same when the lever V is in the position shown in Fig. 5. To hold the valve R in unseated position against the tension of the spring $r^5$ is a spring $r^{12}$, one end of which engages within a tubular casing $r^{13}$ supported by the valve housing, and the other of which engages around a pin $v^4$ carried by the arm $v^5$ of the lever V. The compressive force of the spring $r^{12}$ can be varied by the slide block $r^{14}$ within the casing $r^{13}$ and the adjusting screw $r^{15}$ which extends through said casing. The branch $v^2$ of the lever V extends through a slot $v^6$ in an angular bracket member $v^7$ which is secured to the end member B, as shown at $v^8$. Intermediate its ends the arm $v^2$ rests upon a spindle $w$ which is carried by an operating lever W, the upper end of which is fixed to a shaft $v^9$ supported by the bracket $v^7$, the other end of said lever being provided with an operating handle $w'$.

The valves S and T are of substantially the same construction as the valve R and are housed within a casing or casting S' provided with a valve chamber $s$ for the valve S, a bore $s'$ below the valve S and through which the valve pin $s^2$ projects, a valve chamber $t$ for the valve T, a bore $t'$ below said valve chamber and through which the valve pin $t^2$ extends, it being understood that the valves S and T are pressed against their seats by springs, and the valve pins $s^2$ and $t^2$ are guided by packed bushings in the same manner as the valve R. The pipe $o^3$ connects with the valve chamber S through a perforated boss at the side of the housing S'. Within the housing there are connecting ducts $s^3$, $s^4$, and $s^5$, which, when the valve S is unseated, place the valve chambers $s$ and $t$ in communication. Connecting with the valve chamber $t$ is a pipe $o^{11}$ leading to the quick return valve U. Connecting with the bore $t'$ below the valve chamber $t$ is a perforated boss $t^3$ to which the pipe $o^8$ is connected. The ducts $s^3$, $s^4$ and $s^5$ are formed within the casing by drillings from the exterior thereof, the open ends of said drill holes being subsequently closed with hydraulic seals by the plugs $s^6$, $s^7$ and screw $s^8$. Pivotally supported by the casing S', as shown at $s^9$, in a manner similar to the support for the T-shaped lever V by the housing of the valve R, is a T-shaped lever X, the top arms $x$ and $x'$ of which are each fitted with an adjustable screw $x^2$ and $x^3$, the inner ends of which are adapted to engage the ends of the valve rods $s^2$ and $t^2$, respectively, to unseat the same. The lever X is normally held in the position shown in Fig. 4 through the medium of a coil spring $s^{10}$ mounted in a manner similar to the spring $r^{12}$ shown in Fig. 5, in which position the valve S is seated and the valve T is unseated. To provide for the tilting action of the lever X about its pivot $s^9$ and for the rocking of said lever through mechanical means, the end of the branch $x'$ extends within a cut away portion $s^{11}$ of a bearing $s^{12}$ within which the hub $w^2$ of a bell-crank lever $w^3$ extends, a part of said hub being cut away as shown at $w^4$. For operating said bell-crank lever $w^3$ by the operating handle $w^1$, there is provided a link $w^5$, one end of which is pivotally mounted to a pin $w^{5a}$ and the other end of which is provided with an elongated slot $w^6$ through which extends a pin $w^7$ carried by the end of bell-crank lever $w^3$. The arm $x^4$ of the T-shaped lever X extends through a guide slot $x^6$ and angle bracket $x^7$ which is secured to the end member B by bolts $x^8$.

Mounted in upright position upon the top of head-plate $e'$ so as to be movable therewith is a rod $x^9$, the top of which is bifurcated and carries between said bifurcations a roller $x^{10}$, having an opening therein through which extends a rod $w^9$, one end of which is pivotally connected to one end of the bell-crank lever $w^3$, as shown at $w^{10}$, and upon the other end of which are adjustably mounted a pair of nuts $w^{11}$ adapted to serve as an abutment for the roller $x^{10}$. In this connection it will be apparent that as the ram G is making its extrusion stroke the rod $x^9$ will move along the rod $w^9$ and at the end of the extrusion stroke will engage the stops $w^{11}$ to tilt the bell-crank lever $w^3$ about its pivot $w^2$, whereupon the T-shaped lever X will be moved about its pivot $s^9$ to open the valve T and permit the valve S to close, as shown in Fig. 4.

The quick return valve U comprises a casing $u$ having a valve chamber $u'$, a valve seat $u^2$, a bore $u^3$ below the valve chamber, an enlarged chamber $u^4$ below the bore $u^3$, a reduced bore portion $u^5$ below the chamber $u^4$, an enlarged chamber $u^6$ below the bore $u^5$, and a bore $u^7$ below the chamber $u^6$, the open end of said last named bore being internally screw-threaded, as shown at $u^8$. The casing $u$ is of substantially cylindrical shape and is formed with a lateral boss $u^9$ having threaded openings $u^{10}$ and $u^{11}$ communicating with the chambers $u'$ and $u^4$, respectively. The casing also has lateral bosses $u^{12}$ and $u^{13}$ disposed at an angle to the boss $u^9$, and said bosses are also formed with internally screw-threaded bores $u^{14}$ and $u^{15}$ which communicate with the chambers $u'$ and $u^6$, respectively. The pipe $o^{11}$ leading from chamber $t$ is screw-threaded in the bore $u^{10}$. The pipe $o^7$ which leads to the oil tank screw-threadedly engages in the bore $u^{11}$. The pipe $o^5$ which connects with the source of pressure fluid is screw-threadedly engaged in the bore $u^{15}$. The pipe $o^{12}$ screw-threadedly engages in the bore $u^{14}$ and leads to the interior of the main cylinder E. The valve U is normally held upon its seat $u^2$ by the pressure of a coil spring $u^{16}$ housed within a hollow cap nut $u^{17}$ which screw-threadedly engages within the top of the casing $u$. The valve U below its seating surface is provided with a cylindrical guiding portion having grooves $u^{18}$ therein. Moving within the casing $u$ below the valve U is a plunger $u^{19}$ having an intermediate portion $u^{20}$ of somewhat enlarged diameter having a close sliding fit in the bore $u^5$. The plunger $u^{19}$ also has a close sliding fit through the bore of a thimble $u^{21}$ which extends throughout the length of the chamber $u^6$ and is provided with lateral openings $u^{22}$ whereby liquid within the chamber $u^6$ may enter the thimble and act upon the tapered face $u^{23}$ of the enlarged part $u^{20}$ of the plunger. To insure a hydraulic seal between the plunger and the casing throughout its movements, a packing $u^{24}$ encircles the enlarged part $u^{20}$ of the plunger, and a packing $u^{25}$ encircles the plunger stem. The packings $u^{24}$ and $u^{25}$ are held in compressed and leak-tight engagement with the plunger through the medium of a screw-threaded plug $u^{26}$ which engages within the threaded bore $u^8$. The lower end of the plunger $u^{19}$ is screw-threaded and has mounted thereon a hand wheel $u^{27}$ which is held in position thereon by a nut $u^{28}$. The function of the hand wheel $u^{27}$ is merely to pull the plunger $u^{19}$ downwardly in the event that it should stick in its uppermost or valve U unseating position. The operation of this valve mechanism will be presently explained.

*Operation.*—Assuming that the motor Q and the pump O to be running and the paste or flux within the cylinder L to be in a liquid state, in order to start the machine the lever W is moved to the right as viewed in Figs.

1 and 3. This movement changes the positions of the arms $v^2$ and $x^4$ of the levers V and X, respectively, from the full line position shown in Fig. 1 to the dotted line position therein shown, in which latter position the valves R and T will be closed and the valve S will be open. In this position of the valves, oil under pressure from the pump passes through valve S, through ducts $s^3$, $s^4$, $s^5$, valve chamber T, pipe $o^{11}$, valve chamber $u'$ and pipe $o^{12}$ into main cylinder E. At the same time the backing cylinder and the chamber $u^6$ are open to the pressure line in view of the pipe connections $o^4$ and $o^5$. In view, however, of the difference in the effective areas of the valve U and surface $u^{22}$ and the fact that the spring $u^{16}$ is pressing upon valve U to maintain it closed, said valve will remain closed. The effective pressure on the main cylinder $e$ being far greater than that upon the piston $m$, the ram G will be moved forward or will be making its extrusion stroke. The ram G upon entering the extrusion cylinder $h^2$, will act upon the slug which has been positioned therein to extrude the same through the openings $j^6$ into the chamber $j^7$ and pass the complemental tapered surfaces on the nozzle and die to enclose a core of paste which will flow through the nozzle $j^{11}$. The resulting product is illustrated in Fig. 11, the flux being indicated by the reference character Y, and the encircling casing of solder by the reference character Y'. As hereinbefore pointed out, the thickness of the shell Y' may be governed by adjustment of the die member K.

To vary the rate of extrusion, or in other words, the speed of the ram G, the delivery of the pump O can be varied through the medium of the control wheel Z which is mounted upon a shaft $z$ supported in a bearing $z'$ mounted on the end member C, and a bearing $z^2$ mounted on the tank P. At the end of the shaft $z$ there is mounted a sprocket wheel $z^3$ over which is trained a sprocket chain $z^4$, which, in turn, is also trained over a sprocket wheel $o^{15}$ connected to one of the pump members. The pump is of the eccentric type, and by turning the sprocket wheel 15 the eccentricity of the pump is varied and thereby the delivery of the pump controlled.

As the ram G moves forward in making its extrusion stroke, the rod $x^9$ also moves forward. Near the end of the forward stroke the roller $x^{10}$ mounted on the rod $x^9$ contacts with the nut $w^{11}$ on the rod $w^9$, moving the same forward to rock the bell-crank lever $w^3$ in a clockwise direction when viewed in Figs. 1 and 5 to bring the mutilated surface $w^4$ on the hub $w^2$ of said bell-crank lever to the position shown in Fig. 4, whereupon, under the influence of the spring $s^{10}$, the end of the arm $x'$ of T-lever X will be returned to its full line position shown in Fig. 1 in which the valve S will be closed and the valve T open. The valve S being closed, no more oil under pressure is delivered to the main cylinder. Oil under pressure, however, is being delivered to the backing cylinder M and to the chamber $u^6$ in the quick return valve. The oil pressure on the top of valve U being relieved, the pressure acting against the surface $u^{23}$ is sufficient to unseat the valve U and permit the discharge of the oil from the main cylinder through chamber $u'$, ducts $u^{18}$, chamber $u^4$ and pipe $o^7$ back to the tank as the pressure on the backing cylinder piston moves the same rearwardly. Part of the oil from the main cylinder is also at the same time being returned to the tank through pipe $o^{11}$, valve chamber $t$, duct $t'$ and pipe $o^8$. As the backing cylinder piston $m$ is completing its rearward stroke the pin $m^2$ carried thereby will engage the lever $m^6$, which, in turn, operating through the rod $m^7$, will rotate the hub $n$ of the lever N in a clockwise direction when viewed in Figs. 1 and 5 to permit the lever V, under the influence of spring $r^{12}$, to return to the position shown in Fig. 5 to open the valve R, in which open position of said valve the oil from the pump will by-pass therethrough and return to the tank through pipe $o^6$. The cycle of operations thus described being completed, the valve R will be open, the valve S will be closed and the valve T will be open. In view of the opening of the valve U on the return stroke of the ram, it will be appreciated that the discharge of oil from the main cylinder on its return stroke will be much quicker than the movement of the cylinder on its extrusion stroke.

To again continue the extrusion operation, the operator, by pressing upon the treadle $f^{15}$, moves the ram downwardly into its dotted line position shown in Fig. 1, whereupon a slug may be conveniently inserted into the extrusion chamber. The release of pressure upon the treadle will return the ram into alignment with the cylinder E and ready for the next extrusion stroke. To accomplish this the lever W, which will have been returned to its neutral position shown in Fig. 1 through its connection with the bell-crank lever $w^3$, is again moved to the right for a repetition of the functioning of the press as hereinbefore described.

Although the press as described is automatic in its operation, to complete a cycle of operations it once having been started, it will be appreciated that if for any reason it is desired or should become necessary to stop the operation prior to the completion of the extrusion stroke, this may be readily accomplished by moving the operating lever W, as shown in Figs. 1 and 3, to the left.

While we have shown and described a preferred embodiment of our invention and the manner in which the same functions, we do not wish to be limited to the various details of construction and arrangement of parts, since these may be varied through a wide range of equivalents without departing from the spirit of the invention.

What we claim is:

1. An extrusion press comprising a ram, means for reciprocating said ram, means for automatically reversing the movement of the ram at the end of the extrusion stroke, and manually operable means for controlling the rate of movement of the ram.

2. An extrusion press comprising a fluid pressure operated ram, a fluid circuit, means for automatically controlling the fluid circuit for reversing the movement of the ram at the end of the extrusion stroke and manually releasable means for retaining the ram in position at the end of its return stroke.

3. An extrusion press comprising a differential pressure system having a main cylinder, a backing cylinder, a piston movable in each cylinder, a common piston rod connecting said pistons, a ram movable with said pistons, means for supplying fluid under pressure to said cylinders to move the ram, means for automatically reversing the movement of the ram at the end of the extrusion stroke and means for effecting the backward stroke of the ram in less time than the extrusion stroke.

4. An extrusion press comprising a differential pressure system having a main cylinder, a backing cylinder, a piston movable in each cylinder, a common piston rod connecting said pistons, a ram movable with said pistons, means for supplying fluid under pressure to said cylinders to move the ram, and a quick return or by-pass valve interposed in the main cylinder fluid circuit for effecting the backward stroke of the ram in less time than the extrusion stroke.

5. A solder wire extrusion press or the like, comprising a hydraulic pressure operated ram, a pump, a hydraulic circuit, valves in said circuit, and means for automatically controlling the flow of liquid through said valves for reversing the movement of the ram at the end of its forward stroke.

6. A solder wire extrusion press or the like, comprising a hydraulic pressure operated ram, a pump, a hydraulic circuit, valves in said circuit, means for automatically controlling the flow of liquid through said valves for reversing the movement of the ram at the end of its forward stroke, and a quick return valve whereby the reverse stroke of the ram is more quickly completed than the forward stroke.

7. A solder wire extrusion press or the like, comprising a hydraulic pressure operable ram, a differential pressure system for operating said ram consisting of a main cylinder, a backing cylinder, a piston movable in each cylinder, means connecting said piston whereby they are simultaneously movable, a pump, a fluid reservoir, a fluid pressure circuit leading from said pump to said cylinders, a main cylinder valve, a backing cylinder valve, said valves being so related that when the backing cylinder valve is open and the main cylinder valve is closed, the fluid will by-pass through said open valve and the pump will idle, when the backing cylinder valve is closed and the main cylinder valve is open, fluid pressure will enter both cylinders and the ram will move forward, and when both the backing cylinder valve and the main cylinder valve are closed, the fluid pressure will act on the backing cylinder piston to move the ram backward.

8. A solder wire extrusion press or the like, comprising a hydraulic pressure operable ram, a differential pressure system for operating said ram consisting of a main cylinder, a backing cylinder, a piston movable in each cylinder, means connecting said piston whereby they are simultaneously movable, a pump, a fluid reservoir, a fluid pressure circuit leading from said pump to said cylinders, a main cylinder valve, a backing cylinder valve and a quick return valve having ports connecting with the main cylinder, the pressure line and the reservoir, said valves being so related that when both the backing cylinder valve and the main cylinder valve are closed, the fluid pressure will act on the backing cylinder piston to move the ram backward, and upon the quick return valve to open the same to permit the quick discharge of the fluid from the main cylinder to the reservoir, whereby the backward movement of the ram is expedited.

In witness whereof, we have hereunto signed our names.

CONRAD C. JACOBSON.
JAMES SCHWEDER.